United States Patent
Wohrle

(10) Patent No.: US 9,316,548 B2
(45) Date of Patent: Apr. 19, 2016

(54) MEASURING ARRANGEMENT FOR DETERMINING AMOUNT OF HEAT

(75) Inventor: Stefan Wohrle, Füssen (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 695 days.

(21) Appl. No.: 13/514,195

(22) PCT Filed: Nov. 10, 2010

(86) PCT No.: PCT/EP2010/067157
§ 371 (c)(1),
(2), (4) Date: Jun. 6, 2012

(87) PCT Pub. No.: WO2011/069767
PCT Pub. Date: Jun. 16, 2011

(65) Prior Publication Data
US 2012/0245884 A1    Sep. 27, 2012

(30) Foreign Application Priority Data
Dec. 8, 2009 (DE) .......................... 10 2009 047 664

(51) Int. Cl.
*G01F 17/00* (2006.01)
*G01K 17/00* (2006.01)
(Continued)

(52) U.S. Cl.
CPC ............. *G01K 17/10* (2013.01); *G01K 17/06* (2013.01); *G01F 17/00* (2013.01); *G01K 17/08* (2013.01); *G01K 17/12* (2013.01); *G01K 17/185* (2013.01)

(58) Field of Classification Search
CPC .... H01L 23/34; H01L 23/3411; G01R 13/10; G01R 17/185; G06F 17/00; G01K 17/00; G01K 17/06; G01K 17/08; G01K 17/10; G01K 17/12; G01K 17/14; G01K 17/16; G01K 17/18; G01K 17/185
USPC ......................................................... 702/130
See application file for complete search history.

(56) References Cited

U.S. PATENT DOCUMENTS 4,224,825 A * 9/1980 Feller .............................. 374/41
5,030,849 A * 7/1991 Brokaw ........................ 327/513
5,775,811 A * 7/1998 Hiraoka et al. ............... 374/185

FOREIGN PATENT DOCUMENTS

DE          19831557 A1    1/1999
DE     102004054118 A1    5/2006
(Continued)

OTHER PUBLICATIONS
German Search Report in corresponding German Application No. 10 2009 047 664.4, dated Nov. 15, 2010.
(Continued)

*Primary Examiner* — John Breene
*Assistant Examiner* — Lynda Dinh
(74) *Attorney, Agent, or Firm* — Bacon & Thomas, PLLC

(57) ABSTRACT

A measuring arrangement comprising a heat meter having a flow sensor, a first temperature sensor, a second temperature sensor and computing means. The first temperature sensor serves to register a temperature in the feed line of the heat exchanger and the second temperature sensor serves to register a temperature in the drain line of the heat exchanger. The computing means serves to calculate the amount of heat exchanged. A first transfer function, which serves to determine the temperature in the feed line based on a measurement signal of the first temperature sensor, is stored in the computing means; a second transfer function is stored in the computing means; wherein the first transfer function differs from the second transfer function; and the second transfer function serves to determine the temperature in the drain line based on a measurement signal of the second temperature sensor.

7 Claims, 1 Drawing Sheet

(51) Int. Cl.
  *G01K 17/10* (2006.01)
  *G01K 17/06* (2006.01)
  *G01K 17/08* (2006.01)
  *G01K 17/12* (2006.01)
  *G01K 17/18* (2006.01)

(56) References Cited

FOREIGN PATENT DOCUMENTS

| | | |
|---|---|---|
| DE | 102007014810 B3 | 4/2008 |
| FR | 2558954 A1 | 8/1985 |
| WO | WO 03098175 A1 * | 11/2003 |

OTHER PUBLICATIONS

International Search Report in corresponding PCT Application No. PCT/EP2010/067157, dated Feb. 24, 2011.

International Preliminary Report on Patentability and Written Opinion in corresponding PCT Application No. PCT/EP2010/067157, dated Jun. 12, 2012.

* cited by examiner

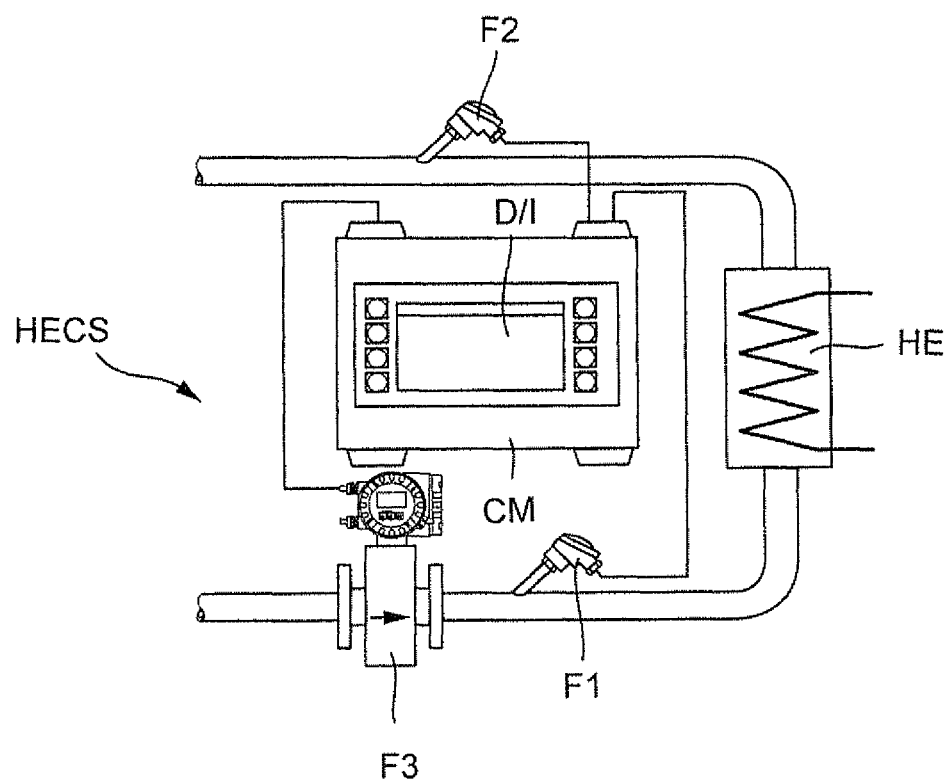

MEASURING ARRANGEMENT FOR DETERMINING AMOUNT OF HEAT

TECHNICAL FIELD

The invention relates to a measuring arrangement comprising a heat meter having a flow sensor, a first temperature sensor, a second temperature sensor and computing means wherein. The flow sensor of the invention serves to register volume or mass of a heat transport medium flowing in the feed line or drain line of a heat exchanger, wherein the first temperature sensor serves to register a temperature in the feed line of the heat exchanger and the second temperature sensor serves to register a temperature in the drain line of the heat exchanger wherein. The computing means serves to calculate, by means of the measurement signals output by the flow sensor and the first and second temperature sensors, amount of exchanged heat.

BACKGROUND DISCUSSION

Known from the state of the art, e.g. from DE 102004054118 B4, are heat meters; which measure the temperature in the feed line and in the drain line of a heat exchanger and calculate the temperature difference between the feed line and the drain line. Moreover, the amount of a heat transport medium, which is most often a liquid, which has flowed through the heat meter, is determined. From the temperature difference as well as the measured amount of liquid, the energy used is calculated. This used energy can then be billed to a consumer using a certain tariff.

Currently, for registering the temperature in the feed line as well as in the drain line, temperature sensors, which have a temperature dependent resistance, are often applied as the measuring transducer. These are known as RTDs.

In such case, it is provided that the temperature sensors are paired, i.e. the resistance temperature characteristic lines are approximately equal. For such purpose, the characteristic lines of various temperature sensors are compared with one another. If, in such case, the characteristic lines of the two temperature sensors approximately match, then the two sensors can be used in a heat meter. Through temperature sensors paired in this manner, a high measurement accuracy can be assured.

A heat meter can be designed as a compact device, i.e. the computing means is fixedly connected to a housing flowed through by the heat transport medium, or as a combination device with a separate computing means, which is connected with the flow sensor and the temperature sensors by electrical cable.

A heat meter of the type described can also be used as a cold meter for application in a cooling system. For a cold meter, this means that, in the heat transport medium, the lower temperatures are in the feed line and the higher temperatures are in the drain line.

As mentioned above, the temperature sensors used in a heat meter are paired according to the requirements of the DIN EN 1434 standard. This, however, has the disadvantage that, in the case of a defect or replacement for any other reason, the temperature sensors cannot be exchanged individually but must be replaced only in pairs.

The requirements for officially verifiable heat meters are described in the standards MID 004 and EN 1434. Therein the use of liquid heat transport media is prescribed. However, heat meters can also be used for energy measurement of vapor or gaseous media in non-officially verifiable applications.

Additionally, only one transfer function, which is used for the two temperature sensors, is stored in the computing means for determining the respective temperatures. In general the transfer function reflects the relationship between an input variable and an output variable. In the case of a temperature sensor of a heat meter a measurement signal of the temperature sensor is transmitted to the computing means. The measurement signal, in such case, serves as the input variable from which the output variable, i.e. the temperature associated with the measurement signal, is determined by means of the transfer function. Since, however, the respective temperature resistance characteristic lines do differ from one another, in spite of the paired temperature sensors, errors in determining the amount of heat do unavoidably occur. It is known from the state of the art to use a set of standard parameters, as given, for example, in EN 1434-3, in order to describe the transfer function.

SUMMARY OF THE INVENTION

An object of the invention, therefore, is to provide a heat meter, in the case of which also the replacement of individual temperature sensors is possible.

The object is achieved according to the invention by features including that a first transfer function, which serves to determine the temperature in the feed line based on a measurement signal of the first temperature sensor, is stored in the computing means, a second transfer function is stored in the computing means, wherein the first transfer function differs from the second transfer function, and the second transfer function serves to determine the temperature in the drain line based on a measurement signal of the second temperature sensor.

A basic concept of the present invention is to define or store in the heat meter, i.e. in the computing means, the transfer functions of the temperature sensors, so that high measurement accuracies can be achieved without the application of paired temperature sensors.

In an embodiment, the computing means serves, furthermore, to determine the difference between the temperature in the feed line and the temperature in the drain line. Based on the measurement signals of the temperature sensor in the feed line and/or the drain line, the temperature in the feed line and/or the drain line can be determined based on the respective transfer function. Then the difference of the ascertained temperatures can be ascertained, so that the amount of heat can be calculated therefrom.

In an additional embodiment, parameters serving to determine the first and/or second transfer function are stored in the computing means. The parameters can serve to determine the transfer function. Thus, in such case, the parameters can be, for example, coefficients of a (transfer) function.

In an additional embodiment, the parameters are sellable as a function of the temperature sensor used. A user can, for example, set the transfer function corresponding to a used and/or newly connected temperature sensor, for example, via an input function of the computing means.

In an additional embodiment, the first and second temperature sensors, in each case, utilize temperature dependence of electrical resistance for determining temperature, respectively, in the feed line and in the drain line.

In an additional embodiment, the first and second temperature sensors are unpaired temperature sensors. Advantages are obtained especially for unpaired temperature sensors, whose characteristic lines agree with one another less than those of paired temperature sensors.

In an additional embodiment, the parameters provide, approximately, curves, especially measured and/or interpolated curves, for the temperature/resistance characteristics of the first and/or second temperature sensor. The temperature sensor can accordingly in advance be calibrated and the corresponding parameters ascertained, which are required for determining the transfer function.

In an additional embodiment, the first and second transfer functions are Callendar-van Dusen equations, and the parameters are coefficients of the Callendar-van Dusen equations.

In an additional embodiment, an officially verifiable log is provided, in which the parameters for determining the transfer functions of the first and second temperature sensors are recorded and, in given cases, a replacement, especially the date of replacement, of one of the temperature sensors is recorded in the officially verifiable log.

BRIEF DESCRIPTION OF THE DRAWINGS

The invention will now be explained in greater detail based on the appended drawing, the sole FIGURE of which shows as follows:

FIG. 1 is a schematic representation of a combined heat meter.

DETAILED DISCUSSION IN CONJUNCTION WITH THE DRAWINGS

FIG. 1 shows a first temperature sensor F1 and a second temperature sensor F2. In such case, the first temperature sensor is arranged in the feed line and the second temperature sensor is arranged in the drain line of a heat exchanger HE. The temperature sensor can be operated, for example, using four conductor, or two conductor, technology. Besides temperature sensor F1, a flow sensor F3 is arranged in the feed line of the heat exchanger. For example, an ultrasonic or magneto-inductive flow sensor can be used as the flow sensor. The first and second temperature sensors as well as the flow sensor are connected to a computing means CM via connecting lines. The computing means is equipped, in such case, with a display/interaction unit D/I. The display thereof can display, for example, the temperatures in the feed line and in the drain line, the amount of flow, the amount of heat, and other process relevant information. Especially, a user can, for example, make settings via the interaction capability (touch screen, keyboard, keypad, etc.) of the display/interaction unit of the computing means. This also enables the user to establish the transfer functions and/or the corresponding parameters for the first and second temperature sensors. These settings can be stored, for example, in a memory unit of the computing means. The memory unit can additionally be in the form of an officially verifiable log, from which input and/or recorded data cannot be deleted. This serves, for example, to protect against tampering.

A resistance temperature sensor is a device for measuring temperature. It comprises a thin metal layer applied on a plastic support. Its resistance changes with temperature. The resistance can be determined via the voltage drop, which occurs when a known electrical current flows through the sensors. By measuring this voltage, resistance is determined and, thus, the temperature corresponding to the voltage.

The relationship between resistance and temperature is described by characteristic lines. In standard IEC 751, the manner of these characteristic lines is described in the form of the Callendar-van Dusen equation with the associated coefficients.

With the help of sensor calibration, the coefficients of the Callendar-van Dusen equation can be individually ascertained for each temperature sensor and used instead of the general coefficients. In this way, one obtains a sensor-specific characteristic line, which enables a more exact temperature measurement. Through this calibration of the temperature sensor, the application of paired temperature sensors (having similar characteristic lines) becomes unnecessary for measuring the temperature difference, since the actual characteristic lines of the temperature sensors are known.

The general Callendar-van-Dusen equation for platinum RTDs is:

$$\text{for } T<0°: R_T = R_0(1 + A \cdot T + B \cdot T^2 + (T-100) \cdot C \cdot T^3)$$

and $$\text{for } T \geq 0°: R_T = R_0(1 + A \cdot T + B \cdot T^2),$$

wherein T is temperature, $R_T$ the measured ohmic resistance, and $R_0$ the ohmic resistance at 0° C. According to EN 1434, the standard values $A=3.908\times10^{-3}/°$ C. and $B=-5.775\times10^{-7}/°$ C.$^2$ are to be used for the coefficients A, B. According to the invention, the coefficients A, B and C can, however, be adjusted for the temperature sensors actually used.

An advantage of the present invention is that any temperature sensors can be used, instead of selected, paired temperature sensors, for temperature difference measurements. Furthermore, individual temperature sensors are exchangeable. Likewise, the replacement of the temperature sensors of officially verified heat meters is possible, without losing the official verification status. This occurs, for example, through the application of an officially verifiable log, which records both the date of the replacement as well as the data for the characteristic line.

An officially verifiable log is used, for example, in gas volume converters and is not specified for heat meters in MID and EN 1434; however, such a log is permitted by PTB A 50.7 (PTB=German National Institute for Science and Technology for the Fields of Metrology and Physical Safety Engineering).

The invention claimed is:

1. A measuring arrangement, comprising:
   a heat meter having a flow sensor;
   a first temperature sensor;
   a second temperature sensor; and
   computing means, wherein:
   said flow sensor serves to register volume or mass of a heat transport medium flowing in a feed line or a drain line of a heat exchanger;
   said first temperature sensor serves to register a temperature in the feed line of the heat exchanger;
   said second temperature sensor serves to register a temperature in the drain line of the heat exchanger;
   said computing means serves to calculate, by means of the measurement signals output by said flow sensor and said first and second temperature sensors, the amount of exchanged heat;
   a first transfer function, which serves to determine the temperature in the feed line based on a measurement signal of said first temperature sensor, is stored in the computing means;
   a second transfer function is stored in the computing means; wherein the first transfer function differs from the second transfer function;
   the second transfer function serves to determine the temperature in the drain line based on a measurement signal of said second temperature sensor;

parameters serving to determine the first and second transfer function are stored in a memory unit of said computing means;

the first and second transfer functions are Callender-van Dusen equations, and the parameters are coefficients of the Callendar-van Dusen equations and the coefficients of the Callender-van Dusen equation for the first and the second temperature sensors are individually ascertained for each temperature sensor.

2. The measuring arrangement as claimed in claim 1, wherein:

said computing means serves, furthermore, to determine the difference between the temperature in the feed line and the temperature in the drain line.

3. The measuring arrangement as claimed in claim 1, wherein:

said parameters are settable as a function of said temperature sensor used.

4. The measuring arrangement as claimed in claim 1, wherein:

said first and second temperature sensors, in each case, utilize temperature dependence of electrical resistance for determining temperature, respectively, in the feed line and in the drain line.

5. The measuring arrangement as claimed in claim 4, wherein:

the parameters provide, curves, for the temperature-resistance characteristics of said first and second temperature sensors.

6. The measuring arrangement as claimed in claim 1, wherein:

said first and second temperature sensors are unpaired temperature sensors.

7. The measuring arrangement as claimed in claim 1, wherein:

a metrological log is provided, in which the parameters for determining the transfer functions of said first and second temperature sensors are recorded; and, if necessary, a replacement, and/or the date of replacement, of one of said temperature sensors is recorded in said metrological log.

* * * * *